United States Patent

[11] 3,607,847

| [72] | Inventors | Maurice Troussier<br>Pierre-Benite;<br>Edouard Grimaud, Oullins, both of France |
|---|---|---|
| [21] | Appl. No. | 871,058 |
| [22] | Filed | Oct. 2, 1969 |
| [23] | | Division of Ser. No. 610,238, Jan. 19, 1967. |
| [45] | Patented | Sept. 21, 1971 |
| [73] | Assignee | Ugine Kuhlmann<br>Paris, France |
| [32] | Priority | Jan. 21, 1966 |
| [33] | | France |
| [31] | | 46,681 |

[54] HALOGENATED ACRYLIC MONOMERS AND POLYMERS
10 Claims, No Drawings

[52] U.S. Cl.................................................. 260/86.1,
260/29.6, 260/41, 260/45.9, 260/79.5, 260/80.81, 260/85.5, 260/86.7, 260/486
[51] Int. Cl.................................................. C08f 15/16
[50] Field of Search........................................... 260/80.81, 86.1, 86.1 E

[56] References Cited
UNITED STATES PATENTS
3,459,790 8/1969 Smith........................... 260/86.1 E

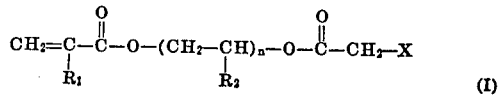

Primary Examiner—Harry Wong, Jr.
Attorney—Pennie, Edmonds, Morton, Taylor and Adams ABSTRACT: Halogenated acrylic monomers of the formula

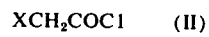

wherein $R_1$ and $R_2$ each is a hydrogen atom or a methyl group, $X$ is a chlorine or a bromine atom, and $n$ is an integer from 1 to 5, are prepared by reacting in the presence of an acid acceptor, (a) halogenated acetyl chloride of the formula $$XCH_2COCl \quad (II)$$

wherein $X$ is a chlorine or a bromine atom and (b) hydroxyl group containing acrylic monomers of the formula

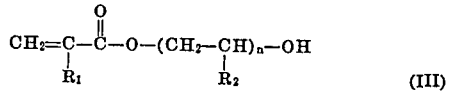

wherein $R_1$, $R_2$ and $n$ each has the same meaning as stated hereinabove. The halogenated acrylic monomers thus produced are suitable for preparing polymers containing reactive halogen atoms.

3,607,847

HALOGENATED ACRYLIC MONOMERS AND POLYMERS

This application is a division of my application Ser. No. 610,238, filed Jan. 19, 1967.

BACKGROUND OF THE INVENTION

1. Field of the Invention

This invention relates to acrylic monomers and copolymers and, more particularly, to halogenated acrylic monomers and the copolymers preparing from the same.

2. Description of the Prior Art

Acrylic elastomers are well known. They have an unusual degree of resistance to the effects of long exposure to heat and a resistance to oils which is relatively satisfactory. However, acrylic elastomers generally have poor mechanical properties and are difficult to be cured because of the absence in the polymeric chain of sufficiently reactive groups.

SUMMARY OF THE INVENTION

We have now found that acrylic polymers containing reactive halogen atoms can be prepared from halogenated acrylic monomers which can be cured simply and effectively and the cured products possess good mechanical properties. According to the present invention, the halogenated acrylic monomers have the following general formula:

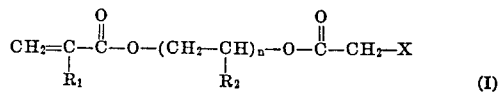

(I)

wherein $R_1$ and $R_2$ each is a hydrogen atom or a methyl group, X is a chlorine atom or a bromine atom, and $n$ is an integer from 1 to 5.

Advantageously, the monomers of the formula (I) are prepared by reacting in the presence of an acid acceptor (a) halogenated acetyl chloride of the formula $$XCH_2COCl \quad (II)$$

wherein X has the same meaning as stated hereinabove, and (b) hydroxyl acrylic monomers of the general formula

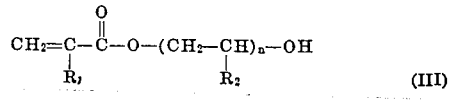

(III)

wherein $R_1$, $R_2$ and $n$ each has the same meaning as stated hereinabove.

The hydroxyl acrylic monomers can be prepared by reacting monoacrylic or monomethacrylic acid and an alkyl diol of the formula

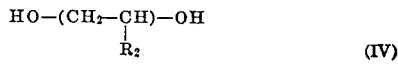

(IV)

or an epoxide of the formula

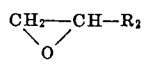

wherein $R_2$ is a hydrogen atom or a methyl group.

The acrylic polymers of this invention, which contain reactive halogen atoms, preferably, are prepared by copolymerizing the halogenated acrylic monomer of the formula (I) with at least one nonhalogenated acrylic ester and, if desired, one or more additional copolymerizable monomers. The suitable nonhalogenated acrylic ester may be selected from the group of acrylic monomers that have the general formula:

(V)

wherein R is an alkyl group having 1 to 8 carbon atoms and $R_1$ is a hydrogen atom or a methyl group. Examples of acrylic monomers of this group include methyl acrylate, ethyl acrylate, butyl acrylate and 2-ethyl-hexyl acrylate. Other copolymerizable monomers that may be used include acrylonitrile methacrylonitrile, styrene, vinyl esters, vinyl ethers and the like.

DESCRIPTION OF THE PREFERRED EMBODIMENT

In preparing the halogenated acrylic monomers of this invention using halogenated acetyl chloride and hydroxyl acrylic monomers, the reaction can be illustrated by the following equation:

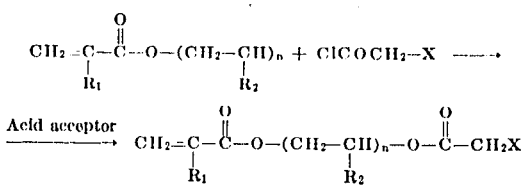

The acid acceptor is used to neutralize the hydrochloric acid generated from the reaction. A number of compounds can be used for this purpose. We prefer to use an organic amine.

The halogenated acrylic monomer thus produced may be recovered by simple washing or preferably by a washing followed by a distillation in vacuum.

Some of the preferred forms of halogenated acrylic monomers are as follows:

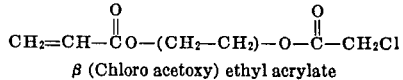
β (Chloro acetoxy) ethyl acrylate

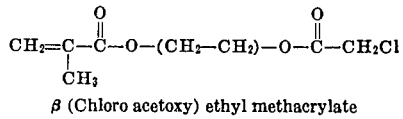
β (Chloro acetoxy) ethyl methacrylate

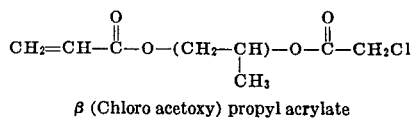
β (Chloro acetoxy) propyl acrylate

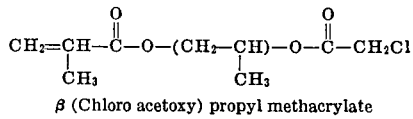
β (Chloro acetoxy) propyl methacrylate

To prepare acrylic copolymers, the halogenated acrylic monomers of this invention are copolymerized with nonhalogenated monoacrylate and, if desirable, one or more copolymerizable monomers in a manner similar to the existing copolymerization process for acrylics. Preferably, the copolymerization is carried out in the form of emulsion polymerization at the temperature between 0° and 100° C.

The amount of chlorinated acrylic monomer to be employed in the copolymerization process must be in such proportions that the quantity of chlorine present in the copolymer shall be between 0.5 percent and 5 percent by weight. The preferred range is between 0.5 percent and 2.5 percent. For brominated acrylic monomer, the amount of bromine in the final copolymer shall be between 1 and 10 percent by weight.

The acrylic copolymers containing reactive halogens can be cured readily. Curing systems using ammonium salts, amines, the derivatives thereof or sulfur and soaps are suitable. More generally, curing may be effected by systems used for other chlorinated elastomers.

Further to illustrate this invention, specific examples are described hereinbelow.

EXAMPLE 1

Preparation of β—(Chloroacetoxy) ethyl acrylate

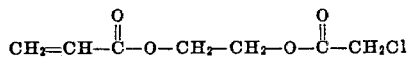

116 grams of hydroxyethyl acrylate, 110 grams of pyridine and 0.2 grams of hydroquinone were introduced into a flask equipped with a mixer and a thermometer. The flask with the mixture was placed in an ice bath. 124 grams of chloroacetyl chloride was then gradually added into the flask. The speed of addition was adjusted so as not to allow the temperature in the reactor to rise above 40° C. This addition required about 45 minutes. Thereafter, the ice bath was removed and the reacting mass was allowed to rest for an hour.

The reaction product was washed several times with water to eliminate the excess chloroacetyl chloride, pyridine and the major part of the pyridine hydrochloride. 165 grams of crude monomer was obtained which was yellowish in color and containing 19 percent of chlorine (theoretical amount 18.44 percent). The crude product was then distilled at about 70° C. in a vacuum of about 0.1–0.2 mm. of mercury. The distillation produced 98 grams of β(Chloroacetoxy) ethyl acrylate which was in the form of a colorless liquid and whose chlorine content was substantially the theoretical amount (18.4 percent). The index of refraction of the monomer was 1.463 at 20° C.

The monomer was preserved by refrigeration and was stabilized by the addition of 50 p.p.m. of hydroquinone. (It should be washed with an alkaline solution before being used in copolymerization.)

EXAMPLE 2

Preparation of β (Chloroacetoxy) ethyl methacrylate

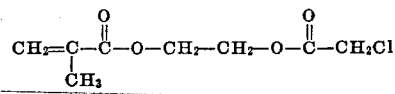

The preparation of this monomer was carried out in a manner substantially the same as that set forth in example 1. In this example the 116 grams of hydroxyethyl acrylate were simply replaced by 130 grams of hydroxyethyl methacrylate.

After the reaction and the washing of the product with water, there were obtained 187 grams of crude monomer. Subsequent to distillation at between 75° and 77° C. and at a pressure between 0.1 and 0.2 mm. of mercury, a fraction of pure β(chloroacetoxy) methacrylate was produced amounting to 99 grams. The product, β(chloroacetoxy) ethyl methacrylate was a colorless liquid whose chlorine content (17.1 percent) corresponded substantially to the theoretical value of 17.2 percent. Its index of refraction was 1.456 at 20° C. The monomer was preserved by refrigeration and was stabilized with hydroquinone.

EXAMPLE 3

Preparation of a copolymer of ethyl acrylate and β(Chloroacetoxy) ethyl methacrylate by emulsion polymerization. The following reactants were used for this preparation: ethyl-acrylate 364 grams; β(chloroacetoxy) ethyl methacrylate, 36 grams; water, 560 grams; sodium lauryl sulfate, 4 grams; crystalized monosodium phosphate, 2 grams; potassium persulphate, 0.24 grams; sodium metabisulfite, 0.12 grams; and 0.016 grams ferrous sulfate (FeSO$_4$, 7H$_2$O). A two-liter round flask equipped with a mixer and a thermometer was placed in a water bath which was maintained at approximately 20° C. Two graduated funnels were mounted on top of the round flask for introducing the reactants therein. 345 cc. of water and the monosodium phosphate were introduced into the flask. The mixture of monomers was placed into one funnel and an aqueous solution of sodium lauryl sulfate (4 grams in 200 cc. of water) in the other. Initially, 30 cc. of sodium lauryl sulfate solution were allowed to flow into the flask. After purging the flask with nitrogen, the persulfate, the bisulfite and the ferrous sulfate in the form of freshly prepared solutions (each salt dissolved in 5 cc. of water) were introduced in the flask using a syringe. Thereafter, the monomers and the rest of the sodium lauryl sulfate solution were added to the flask gradually and simultaneously. From the very start of the addition of the monomers, the temperature in the flask rose and quickly reached 25° C. It was held at this level by adjusting the speed of addition of the reactants, which took about 1½ hours. After the reactants were in the flask, they were held at 25° C. for 3 hours in order to complete the reaction. A sample taken after 3 hours showed that the conversion had been 99 percent completed.

The latex thus obtained was rendered basic (to a pH of about 8) by the addition of a dilute sodium hydroxide solution. All the latex, with the exception of a little sample which was coagulated in a solution of 0.5 percent aluminum sulfate for the purpose of determining the chlorine content, was then coagulated while cold in a solution of 0.5 percent calcium chloride.

The copolymer obtained in the form of white curds was then thoroughly washed with water and then dried in a vacuum at 60° C. It showed a 1.6 percent chlorine content using the portion coagulated with aluminum sulfate. The insoluble fraction in benzene was 4 percent. The intrinsic viscosity of the fraction soluble in benzene at 25° C. was 2.65.

EXAMPLE 4

Preparation of a copolymer of ethyl acrylate and β(Chloroacetoxy) Ethyl Acrylate by emulsion polymerization.

The same operational procedure was followed, as set forth in example 3, utilizing the following mixture of monomers: 366 grams ethylacrylate; 34 grams β(Chloroacetoxy) acrylate.

The copolymer obtained had a chlorine content of about 1.5 percent. The fraction insoluble in benzene was 5 percent. The intrinsic viscosity of the phase soluble in benzene at 25° C. was 0.71.

EXAMPLE 5

Preparation of a copolymer of ethyl acrylate and β(chloroacetoxy) ethyl methacrylate by suspension polymerization.

The following reactants were introduced into a two-liter glass flask: 800 grams water; 0.4 grams polyvinyl alcohol (Rhodoviol HS 100 of Rhone-Poulence); 364 grams ethylacrylate; 36 grams β(chloroacetoxy) methacrylate; and 0.4 grams lauroyl peroxide.

After degassing by purging with nitrogen, the reactor was heated to 70° for 8 hours, with the reacting mixture being stirred vigorously. After this time, the copolymer obtained appeared in the form of fine white beads. It was then washed with water and dried in a vacuum at 60° C. The globules agglomerated together in the course of the drying. 368 grams of copolymer were obtained which had a chlorine of 1.8 percent and had a fraction 92 percent insoluble in benzene.

EXAMPLE 6

Tests of curing the acrylate copolymers using an ammonium salt system.

The copolymers prepared in examples 3, 4 and 5 will be designated respectively A, B and C. From these copolymers, the following mixtures were prepared, the proportions of the constituents being given parts by weight.

TABLE I

|  | A | B | C |
| --- | --- | --- | --- |
| Copolymer | 100 pts. by wt. | 100 pts. by wt. | 100 pts. by wt. |
| Stearic Acid | 2 | 2 | 2 |

Table 1—Continued

| | | | |
|---|---|---|---|
| FEF black (fast extruding furnace black) | 40 | 40 | 40 |
| Ammonium benzoate | 4 | 4 | 4 |
| Lauryl bromide | 2 | 2 | 2 |
| Antioxidant | 1 | 0 | 0 |

The antioxidant employed was the Aminox of Naugatuck Chemical Company. This is a reaction product of diphenylamine and of acetone.

The mixtures were cured for 20 minutes at 150° C. and then reheated for 6 hours at 175° C. The mechanical properties of the vulcanized products obtained are set forth in table II.

TABLE II

| | A | B | C |
|---|---|---|---|
| 100% Modulus (kg./cm.²) (for a 100% elongation) | 50.3 | 43.6 | 73 |
| Resistance to rupture (kg./cm.²) | 144 | 123.4 | 107.5 |
| % Elongation | 200 | 190 | 175 |
| Shore hardness A | 62–63 | 62 | 74 |

The cured copolymer designated as A was subjected to a 70 hours heating test at 175° C. according to the ASTM standards D865–54 T. After this treatment it possessed the following mechanical properties.

TABLE III

| | |
|---|---|
| 100% Modulus (kg./cm.²) | not measurable |
| Resistance to rupture (kg./cm.²) | 88.7 |
| % Elongation | 79.0 |
| Shore Hardness A | 79.0 |

A commercial acrylic copolymer treated in the same way as the sample possessed no mechanical resistance after this severe thermal test.

EXAMPLE 7

Tests of curing the acrylic copolymers using sulfur and alkali soap.

The copolymer used was a copolymer of ethylacrylate and of β(chloroacetoxy) ethyl methacrylate prepared according to example 3 to produce the following mixture, wherein the proportions are expressed as parts by weight.

TABLE IV

| | |
|---|---|
| Copolymer | 100 parts by weight |
| Stearic acid | 2 |
| Phenyl β napthylamine | 2 |
| FEF black | 40 |
| Sodium Stearate | 2.75 |
| Potassium Stearate | 0.75 |
| Sulfur | 0.3 |

The mixture was cured for 12 minutes at 165° C. in a press and was reheated in an oven for 16 hours at 150° C. The thus cured product possessed the following mechanical properties.

TABLE V

| | |
|---|---|
| 100% Modulus (kg./cm.²) | 16.4 |
| Resistance to rupture (kg./cm.²) | 92.3 |
| % Elongation | 290 |
| Shore hardness A | 55 |

We claim:

1. An acrylic elastomer comprising a copolymerized product of (a) a halogenated acrylic monomer of the formula

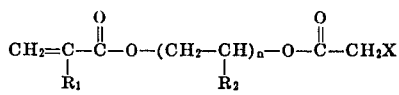

wherein $R_1$ and $R_2$ each is a hydrogen atom or a methyl group, $n$ is an integer from 1 to 5 and $X$ is a chlorine or bromine atom, and (b) a nonhalogenated alkyl acrylic ester wherein the alkyl group contains 1 to 8 carbon atoms and where $X$ is chlorine, the amount of chlorine present in the copolymer is between about 0.5 and 5 percent by weight and where $X$ is bromine, the amount of bromine in the polymer is between about 1 and 10 percent by weight.

2. An acrylic elastomer comprising a copolymerized product of (a) a halogenated acrylic monomer of the formula

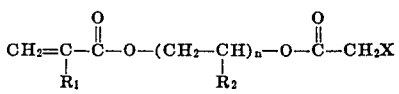

wherein $R_1$ and $R_2$ each is a hydrogen atom or a methyl group, $n$ is an integer from 1 to 5 and $X$ is a chlorine or bromine atom, (b) a nonhalogenated alkyl acrylic ester wherein the alkyl group contains 1 to 8 carbon atoms and (c) one or more monomers capable of copolymerizing with monomers of (a) and (b) and where $X$ is chlorine, the amount of chlorine present in the copolymer is between about 0.5 and 5 percent by weight and where $X$ is bromine, the amount of bromine in the polymer is between about 1 and 10 percent by weight.

3. An acrylic elastomer of claim 1 wherein the halogenated acrylic monomer is β(chloroacetoxy) ethyl acrylate and the nonhalogenated acrylic ester is an alkyl acrylate containing 1 to 8 carbon atoms in its alkyl group.

4. An acrylic elastomer of claim 2 wherein the halogenated acrylic monomer is β(chloroacetoxy) ethyl methacrylate and the nonhalogenated acrylic ester is an alkyl acrylate wherein the alkyl group contains 1 to 8 carbon atoms.

5. A cured product of an acrylic elastomer according to claim 1.

6. A cured product of an acrylic elastomer according to claim 2.

7. A process for producing acrylic elastomers which comprises polymerizing in an aqueous suspension (a) a halogenated acrylic monomer of the formula

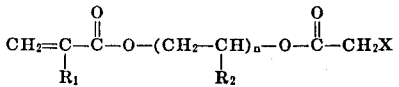

wherein $R_1$ and $R_2$ each is hydrogen atom or a methyl group, $n$ is an integer from 1 to 5 and $X$ is a chlorine or bromine atom, and (b) a nonhalogenated alkyl acrylic ester wherein the alkyl group contains 1 to 8 carbon atoms and where $X$ is chlorine, the amount of chlorine present in the copolymer is between about 0.5 and 5 percent by weight and where $X$ is bromine, the amount of bromine in the polymer is between about 1 and 10 percent by weight.

8. A process for producing acrylic elastomers which comprises polymerizing in an aqueous suspension (a) a halogenated acrylic monomer of the formula

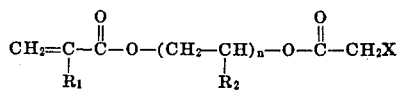

wherein $R_1$ and $R_2$ each is a hydrogen atom or a methyl group, $n$ is an integer from 1 to 5 and $X$ is a chlorine or a bromine atom (b) a nonhalogenated alkyl acrylic ester wherein the alkyl group contains 1 to 8 carbon atoms and (c) one more more monomers copolymerizable with said monomers of group (a) and (b) and where $X$ is chlorine, the amount of chlorine present in the copolymer is between about 0.5 and 5 percent by weight and where $X$ is bromine, the amount of bromine in the polymer is between about 1 and 10 percent by weight.

9. A method according to claim 7 wherein the $X$ is chlorine.

10. A method according to claim 7 wherein the $X$ is bromine.